United States Patent [19]
Lawrence

[11] Patent Number: 5,664,950
[45] Date of Patent: Sep. 9, 1997

[54] HARDWARE MECHANISM FOR COMPUTER SOFTWARE SECURITY

[76] Inventor: Richard J. Lawrence, 3353 Howard Common, Fremont, Calif. 94356

[21] Appl. No.: 600,337

[22] Filed: Feb. 13, 1996

[51] Int. Cl.⁶ .................................................. H01R 9/09
[52] U.S. Cl. ........................ 439/76.1; 361/686; 70/58
[58] Field of Search ..................... 439/76.1; 70/58; 361/686

[56] References Cited

U.S. PATENT DOCUMENTS

| | | | |
|---|---|---|---|
| 4,758,928 | 7/1988 | Wierec et al. | 439/76.1 |
| 5,450,271 | 9/1995 | Fukushima et al. | 70/58 |

*Primary Examiner*—Neil Abrams
*Assistant Examiner*—Barry Matthew L. Standig
*Attorney, Agent, or Firm*—James E. Eakin

[57] ABSTRACT

Nestable software license authentication keys connect end-to-end on a circuit board to form an authentication key assembly for internal computer installation or for use as an external assembly connecting to a host system. The circuit board includes at least one plastic housing for one or more authentication keys which define a male connector at one end and a female connector at the opposite end, which connect to a female phone jack(s) electrically connected to the circuit board and attached to the end of a compression spring mounted within each housing. The spring(s) compresses as additional keys are connected end-to-end on the board and the spring biases the keys against the end of the circuit board. The authentication key assemblies may utilize a variety of circuit boards with a variety of connectors, and the external assembly is encased in the plastic housing for use with portable and Apple-type computers.

5 Claims, 7 Drawing Sheets

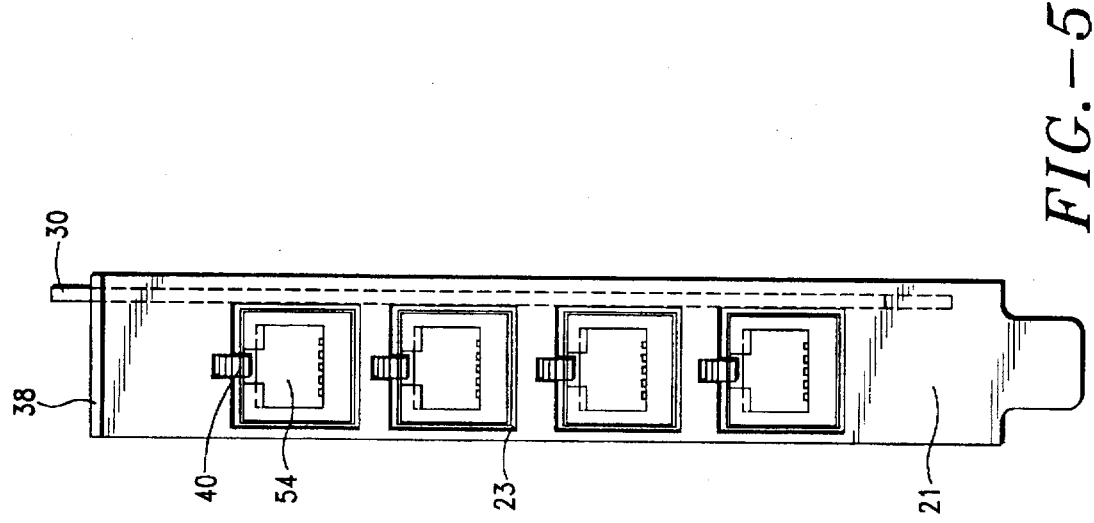
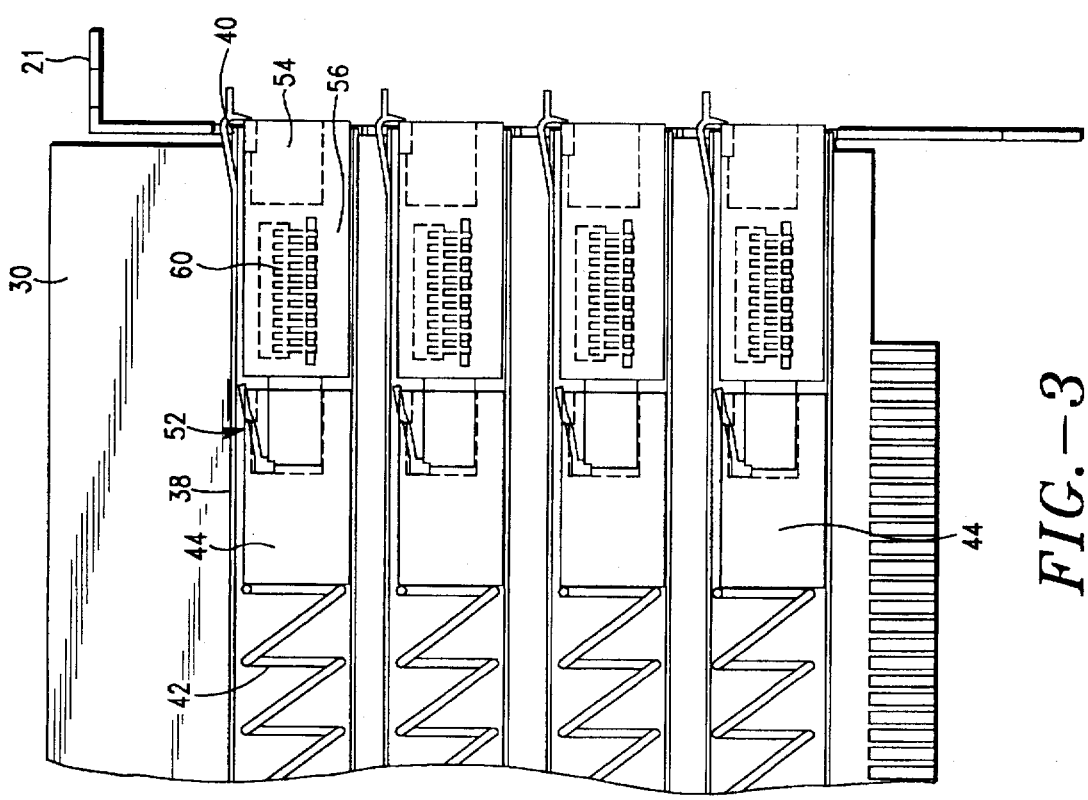

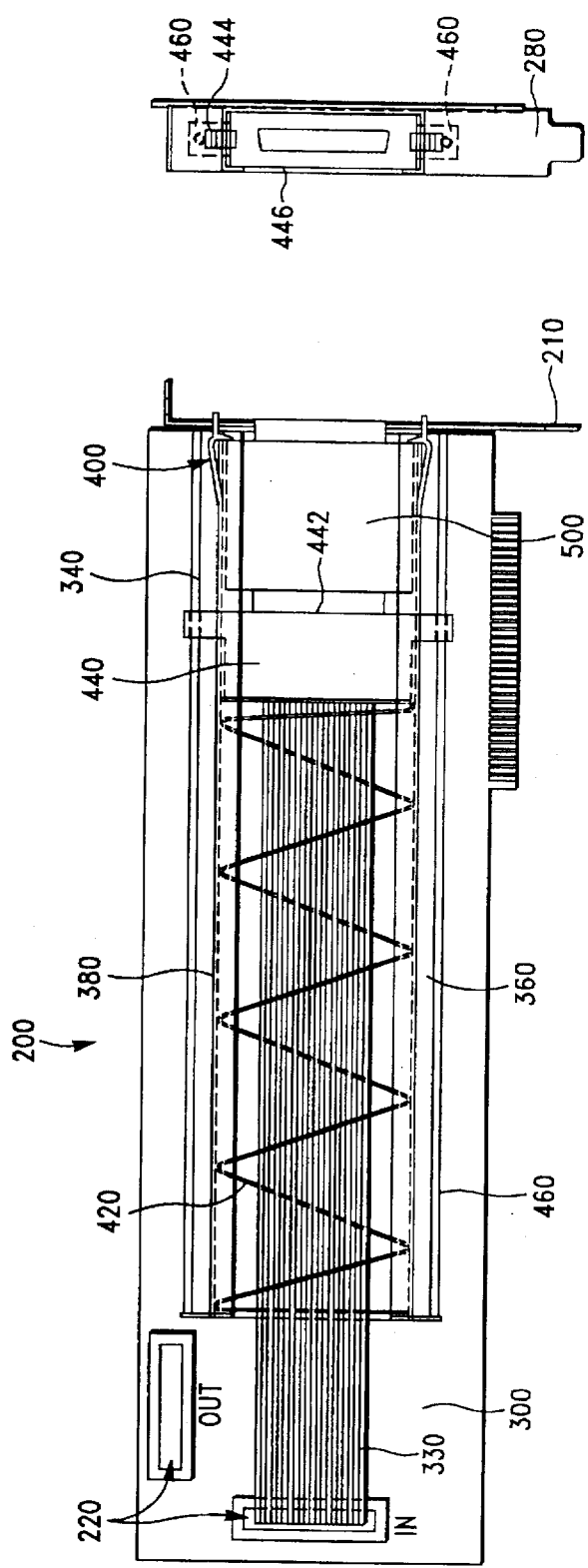
*FIG.-7B*
*FIG.-7A*
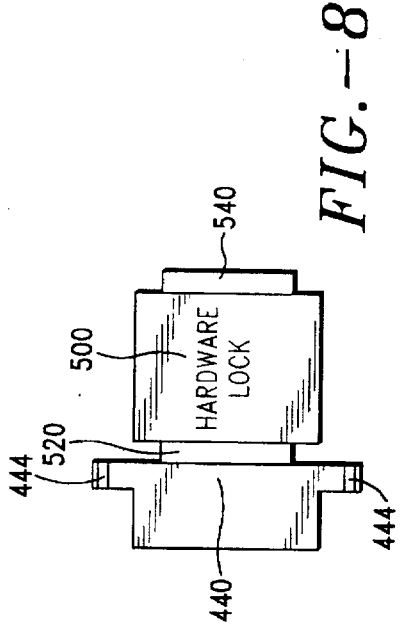
*FIG.-8*

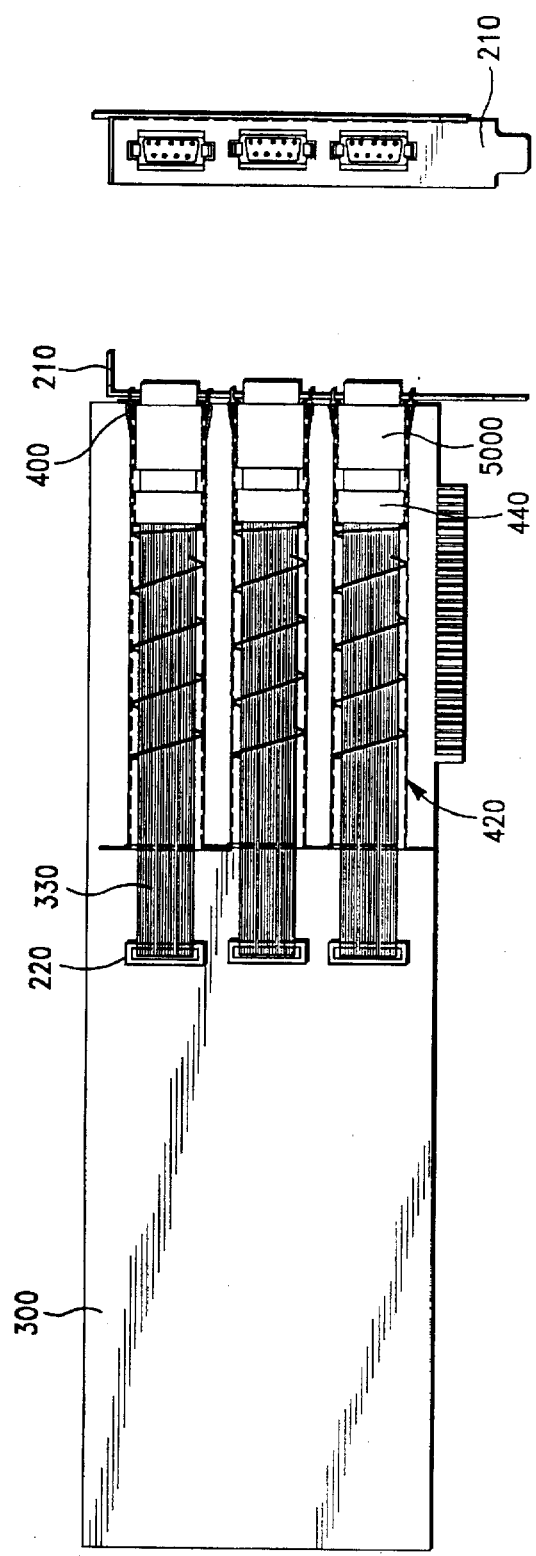
FIG.—9A
FIG.—9B
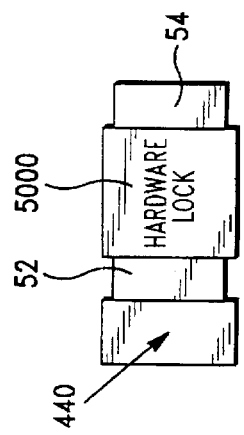
FIG.—10

HARDWARE MECHANISM FOR COMPUTER SOFTWARE SECURITY

FIELD OF THE INVENTION

The present invention relates to security devices for ensuring compliance with computer software licenses. Specifically, the invention relates to nestable hardware "keys" which connect end-to-end and attach to an internal or external expansion board or other adapter for mounting an entire chain of such keys.

BACKGROUND OF THE INVENTION

Security devices for protecting computer software are well known in the prior art. One such device, generally known as a "key" or dongle, is provided with some licensed computer software to prevent software piracy. The key is an I/O device which attaches to the parallel port, serial port, or small computer system interface (SCSI) port of a computer and includes a memory circuit with a stored, encrypted algorithm, such as a password or serial number. During initial installation of the protected program, the encrypted password is stored as a boot patch within the computer. The stored password, perhaps a serial number, looks for an associated password during each supported program initialization process to ascertain whether the correct key is attached properly to the computer system. Initialization of the program is disallowed unless the key password is compared and found to be associated with the stored password.

A number of drawbacks and limitations exist while using current "keys". First, keys generally are installed in the first parallel port, LPT 1, which typically is used for installation and operation of printers and other peripherals. Keys frequently interfere with the use of printers by causing the host computer to receive a busy signal when addressing LPT1.

Additionally, keys are a nuisance because they generally are installed externally and extend outward from LPT 1. Such external installation is cumbersome and prevents, for all practical purposes, installation of more than one key at a time. Increased concerns with ensuring compliance with software licensing has lead to the need to install more than one key.

A heretofore unmet need exists for a method and apparatus enabling internal mounting of multiple, nestable keys, or secure external mounting of such keys, without interfering with operation of LPT1 for other operations, particularly printing operations.

SUMMARY OF THE INVENTION WITH OBJECTS

A nestable key and key mounting mechanism includes a key housing defining a multi-contact receptacle on one end thereof in communication with a multi-contact plug on the opposite end thereof to allow daisy chain connection of keys. One or more keys, connected end-to-end, are installed into a guide which attaches to a circuit board adapted to serve as a housing for the key(s) and an external or internal interface with the computer microprocessor using, for example, LPT3. The guide mechanism is one or more non-conductive tubes each having a tensioning device for biasing the position of the nestable keys towards the connection end of the board. A plurality of interconnected or individual non-conductive tubes each surrounding a tensioning device may be used, particularly for internally mounted circuit boards, and the board may be surrounded with a plastic case, or other non-conductive case, for external circuit boards. The specially configured board also serves as an interface between the computer central processing unit (CPU) and the authentication software located within the key.

A general object of the invention is to provide an authentication key which overcomes the drawbacks and limitations of the prior art.

A specific object of the invention is to provide a nestable authentication key and mounting mechanism to enable internal or external installation of one or more keys connected end-to-end.

Another specific object of the invention is to provide a mounting apparatus for keys, including a circuit board configured with one or more tensioning devices, such as compressible springs, for biasing the position of keys towards the end of the circuit board.

Yet another specific object of the invention is to provide an external housing for a circuit board designed to mount one or more authentication keys in a daisy chain arrangement thereon.

A further object of the present invention is to provide a security device which interfaces to a computer system without interfering with print processes or operation of other peripherals.

These and other objects, advantages and features of the present invention will become more apparent upon considering the following detailed description of preferred embodiments, presented in conjunction with the accompanying drawings.

BRIEF DESCRIPTION OF THE DRAWINGS

In the Drawings

FIG. 3 is an enlarged side view of area 2 of FIG. 2.

FIG. 5 is an end view of the authentication key mounting mechanism of FIG. 2.

FIGS. 7A and 7B are, respectively, side and end views of another aspect of an authentication key and mounting mechanism.

FIG. 8 is a side view of an authentication key attached to the connector and without the housing shown in FIGS. 7A and 7B.

FIGS. 9A and 9B are, respectively, side and end views of yet another aspect of an authentication key and mounting mechanism.

FIG. 10 is a side view of an authentication key and connector without the housing shown in FIGS. 9A and 9B.

DESCRIPTION OF PREFERRED EMBODIMENTS

Figure 1:
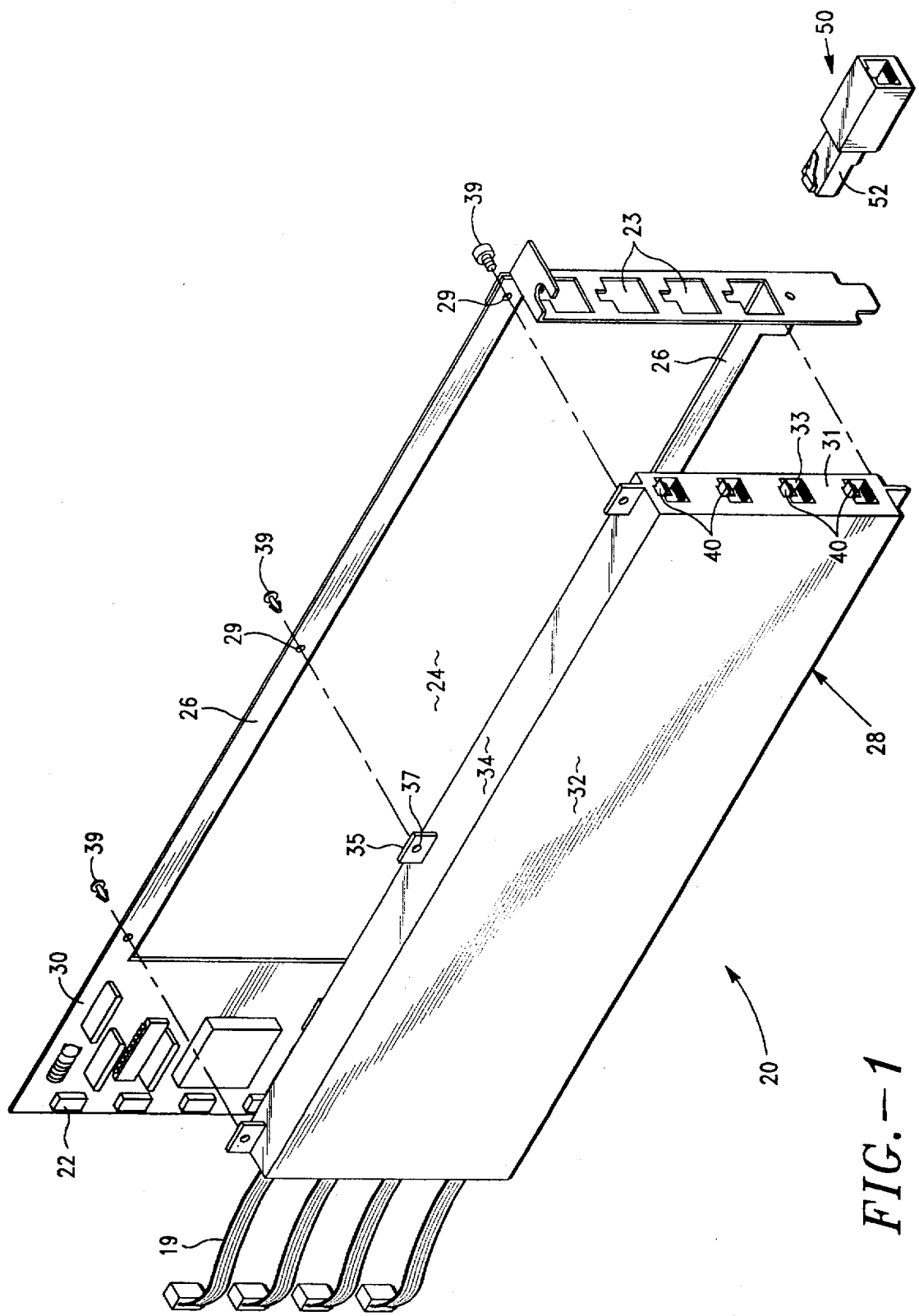
FIG. 1 is an exploded perspective view of an authentication key and mounting mechanism embodying principles of the present invention.
Figure 2:
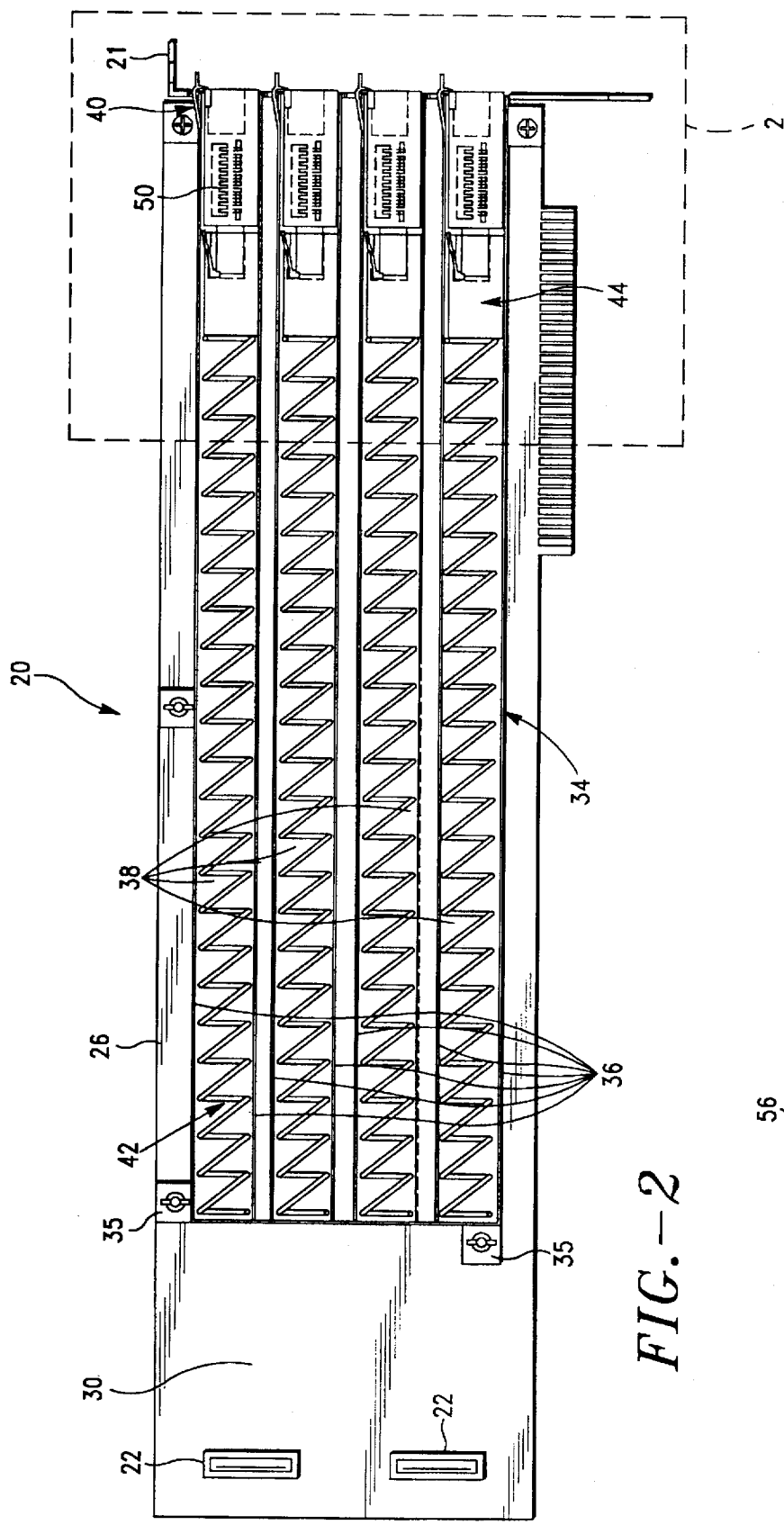
FIG. 2 is a side view of the authentication key and mounting mechanism of FIG. 1 with the top cover removed to show the mounting mechanism.
Figure 6:
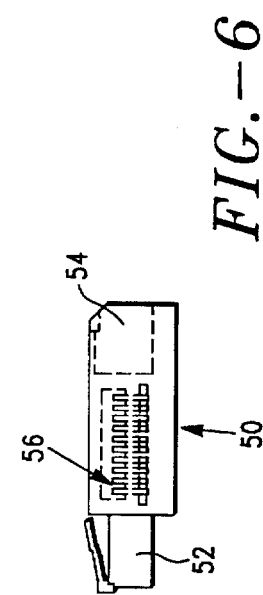
FIG. 6 is a side view of the authentication key shown in FIGS. 1 through 5.

An adapter housing and authentication key assembly are shown generally in FIGS. 1 and 2 as reference number 20.

Referring now to FIGS. 1–6, the assembly 20 defines key mounting apparatus including a circuit board 30, in the example shown an 8 bit COM/LPT edge connector interface board, which also serves as an interface between the computer microprocessor, using an LPT port, and an authentication key. While the LPT port is a preferred interface in at least some embodiments of the invention, in other embodiments any available parallel, serial, or other port may be used, including shared ports. The board 30 enables connection of the authentication key(s) to either the COM port or to the LPT port using cables 19 which connect to LPT jack 22. Alternatively, conventional RS-232 cables may be provided to connect the board 30 to the microprocessor.

The circuit board 30 preferably is modified by providing a generally rectangular cut out area 24 surrounded on both long sides by circuit board mounting walls 26. Mounting holes 29 are provided in the walls 26 for mounting one or more housings 28. The housings 28 are preferably made from plastic, although other non-conductive materials may be used. The housing 28 shown as an example in FIGS. 1–6 defines a unitary top wall 32, paired side walls 34, a bottom wall (not shown), and a front wall 31 defining mounting openings 33. Mounting flanges 35 having apertures 37 therethrough allow the housings 28 to be attached to circuit board mounting walls 26 by placing screws 39 through mounting holes 29.

Figure 4:
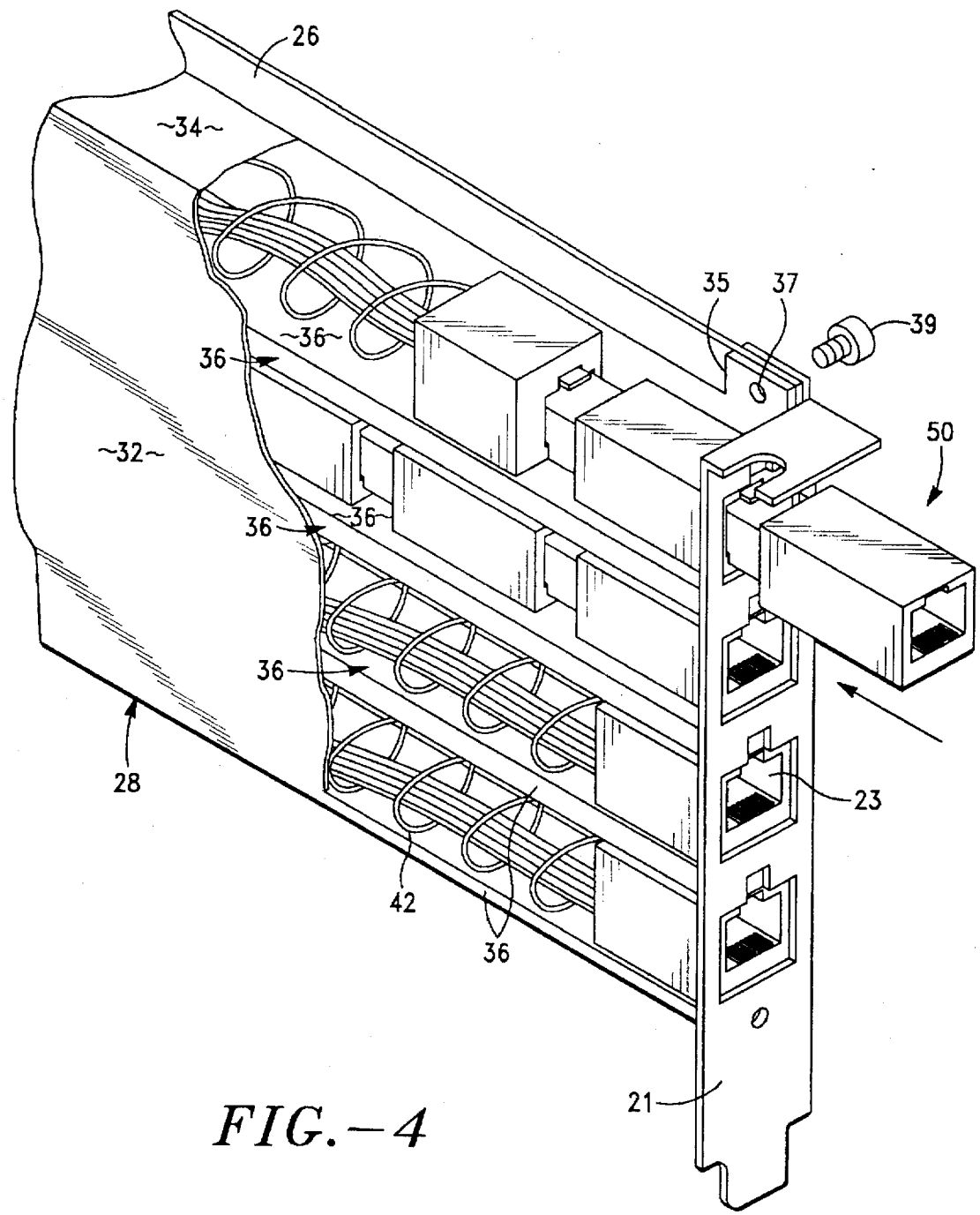
FIG. 4 is an enlarged perspective view of area 2 of FIG. 2 with a break away view of the top cover.

As best shown in FIGS. 2 and 4, the housing 28 further defines eight, parallel interior guide walls 36 thereby forming four, enclosed guide tubes 38. The guide tubes 38 of the housings 28 form protective receptacles for surrounding one or more authentication keys.

The housing 28 shown in FIGS. 1–6 is presented as an example only and may be modified so that the housing side walls 34 form the two outside guide walls 36 of the four guide tubes 38 thereby reducing the number of interior guide walls 36 to six. Additionally, the housing 28 may be molded so that the guide tubes 38 are four separate tubes interconnected by contiguous bottom walls therebetween.

As best shown in FIG. 1, the front wall 31 of the housing 28 is secured against a back plate 21 the circuit board 30 when the housing 28 is attached to the circuit board 30. The back plate 21 is used to secure the board 30 within an expansion slot of the computer CPU. Mounting openings 23 are provided in the back plate 21 for access therethrough to mating mounting openings 33 in the front wall 31 of the housing 28. A mechanical back stop 40 extends from one guide wall 36 of each of the guide tubes 38 to retain authentication keys within the openings 23, 33 in, respectively, the back plate 21 and the end wall 31.

At least one tensioning device 42, such as a compressible spring, is mounted to the board 30 by inserting the tensioning device 42 into a guide tube 38. Four springs 42, one in each guide tube, are shown as the tensioning devices in FIGS. 2–5. A conventional female phone connector jack 44, which is electrically connected to circuit board 30, is positioned at the end of each spring 42. The connector jacks 44 may or may not be attached to the end of the springs 42.

One end of an authentication key 50 is attached to each female phone connector jack 44. Compression of the springs 42 allows additional keys 50 to be mounted to the board 30 by connecting the keys 50 end-to-end and inserting the connected keys 50 within guide tubes 38 of the housing 28. The guide tubes 38 of the housing 28, together with the resistance provided by the tensioning device 42, maintains alignment of the connected jacks 44 and the keys 50 as the spring 42 biases the key 50 towards the end of the board 30.

Each key 50 defines a male connector end 52 and a female connector end 54 to enable interconnection of keys 50 in a daisy chain arrangement. The male connector end 52 of the first key 50, inserted within a guide tube 38 for attachment to the board 30, attaches to the female phone connector jack 44. A second key is connected to the first key 50 by inserting the male connector 52 of the second key into the female connector end 54 of the first key. The connectors 54 may be, for example, four pin, six pin, or eight pin phone connectors. The keys 50 further define a housing 56 for a conventional authentication chipset 60. Connectors 52 are operatively connected to connectors 54 in a pass through arrangement.

A second aspect of the present invention is shown in FIGS. 7A, 7B and 8 as reference number 200. FIG. 7A shows an authentication key assembly 200 utilizing for a key mounting apparatus a conventional 8-bit bus RS-232 expansion board 300 which may add an LPT port, or may be used in place of an LPT port, and occupies a single expansion slot in a CPU. An RS-232 jack 220 is provided for cables 330 from the jack 220 to the motherboard of the microprocessor.

The authentication key assembly 200 includes a generally rectangular, plastic guide tube 380 housing a spring 420 to which is attached a DB-9 or DB-25 female connector 440 defining a cable end having a 9 or 25 pin female D-shell. The female connector 440 is electrically connected by cables 330 to the RS-232 jack 220. The female connector 440 defines a key connecting end 442 having a pair of flanges 444 which extend from and are wider than the width of the upper portion of the plastic guide tube 380. One or more external, conventional keys 500, as described above for interfacing with an LPT port, may be attached end-to-end with the first key 500 connected to connector 440. The key(s) 500 are tensioned by the spring 420 and held in position on the board 300 within the guide tube 380 by a back stop 400 at a single opening 446 through back plate 210. The plastic guide tube 380 defines a lower, outer portion 280 extending from and integral with the upper portion of the guide tube 380. The outer portion 280 is shaped to define a channel, or tensioner guide 460, to align the key(s) 500 during insertion to secure the key(s) 500 within the channel 460 which serves as a lock support track. Up to four keys 500 may be installed on the board 300 in this aspect of the invention.

A third aspect of the present invention is shown in FIGS. 9A, 9B, and 10, utilizing, as in the FIG. 7A embodiment, a conventional 8-bit RS-232 LPT expansion board 300 for mounting one or more conventional DB-9 authentication keys 5000. A DB-9 RS-232 female connector 440 is provided at the end of each of three springs 420, and each connector 440 is connected by RS-232 cables 330 to an RS-232 jack 220. The back plate 210 and back stops 400 are provided as described above. The DB-9 key(s) 5000 define a male connector end 520 and a female connector end 540 for connection to, respectively, the female connector 440 and another key 5000 or other computer peripheral.

Figure 11:
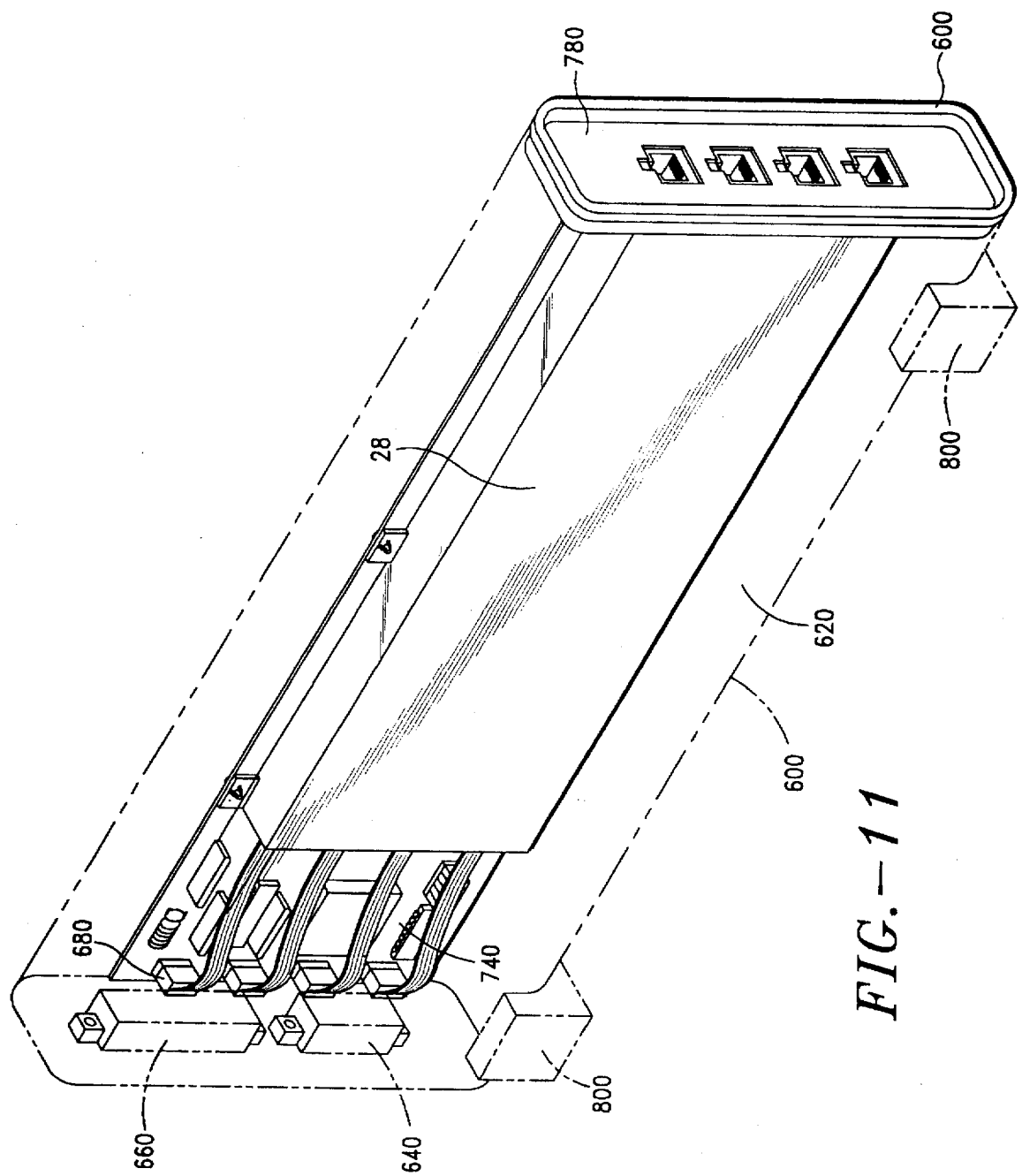
FIG. 11 is a perspective view of another aspect of an authentication key and mounting mechanism showing, in phantom view, a case which may be provided for external use.

FIG. 11 depicts a fourth aspect of the present invention particularly suitable as an external authentication key assembly for portable computers and for Apple computers, although it will be recognized by those skilled in the art that the assembly also can be mounted internally. A plastic case 600 encloses a housing 28, such as the housings in FIGS. 1 or 7A, mounted to circuit board 620 having a 9-pin end connector 640 and a 25-pin end connector 660. An RS-232 jack, or a SCSI port 680 is provided as an interface between LPT, RS-232, or SCSI cables. A locking plate cover 780 is also provided at the end of the encased assembly to enable secure external use. The encased assembly may be attached to a portable computer by a strip of Velcro or the like (not shown), or it may be secured in support blocks 800.

It will be recognized by those skilled in the art that other standard bus interface connectors may be used on the circuit boards used to mount the authentication keys shown above. For instance, other interface connectors such as EISA (extended industry standard architecture 32-bit), Micro Channel 32-bit, ISA, SPARC, NeXt, or Apple NuBus connectors may be on the selected circuit board. Additionally, the circuit board may be single or double sided and may have card edge connectors, a pin connector (for example, 8 or 16 pins) or a mating male connector at the rear most short side of the board.

While this invention has been described in connection with preferred embodiments thereof, given the teachings herein, modifications and changes may be made by those skilled in the art to which it pertains without departing from the spirit and scope of the invention. For instance, the compression springs shown are an example only and any type of device applying appropriate pressure may be used to bias the authentication keys. Accordingly, the aspects discussed herein are for illustration only and should not limit the scope of the invention herein which is defined by the claims.

What is claimed is:

1. A hardware adapter for connecting one or more authentication keys to a computer comprising:

circuit board means adapted for connection to a host;

housing means on the circuit board means for supporting at least one tensioning means having a female connector means at an end thereof and electrically connected to the circuit board means; and at least one pair of key male and female connector means electrically connected and adapted to connect a conventional authentication key therebetween, the key male connector means further attaching to the female connector means at the tensioning means and the key female connector means enabling end-to-end connection of additional conventional authentication keys mounted between additional pairs of key male and female connector means.

2. The authentication device of claim 1 wherein the circuit board means is adapted to be mounted within an expansion slot of a computer central processing unit.

3. The authentication device of claim 1 wherein the circuit board means is adapted to be externally connected to a computer and the housing means encases the circuit board means.

4. The authentication device of claim 1 further comprising stop means for securing at least one pair of the key male and female connectors, having a conventional authentication key mounted therebetween, to the circuit board means.

5. The authentication device of claim 1 having at least two tensioning means mounted within at least two guide channels formed in the housing means, pressure applied by the tensioning means enabling end-to-end connection of a plurality of pairs of key male and female connectors, each pair having a conventional authentication key mounted therebetween, at the end of each tensioning means.

* * * * *